Dec. 11, 1923. 1,477,088

R. C. TURNER

APPARATUS FOR PURIFYING LIQUIDS

Filed May 19, 1919

Witnesses

Inventor
Robert C Turner
By Edwin S Clarkson
his Attorney

Patented Dec. 11, 1923.

1,477,088

UNITED STATES PATENT OFFICE.

ROBERT C. TURNER, OF COLUMBUS, OHIO, ASSIGNOR, BY MESNE ASSIGNMENTS, TO ELECTROPURE CORPORATION, OF DETROIT, MICHIGAN, A CORPORATION OF DELAWARE.

APPARATUS FOR PURIFYING LIQUIDS.

Application filed May 19, 1919. Serial No. 298,232.

*To all whom it may concern:*

Be it known that I, ROBERT C. TURNER, a citizen of the United States, residing at Columbus, in the County of Franklin and State of Ohio, have invented certain new and useful Improvements in Apparatus for Purifying Liquids, of which the following is a specification.

In the use of my invention milk and other liquids may be efficiently, and at a slight cost purified, sterilized or aged in a comparatively short time.

My invention consists of a flat runway for the liquid, a series of electrodes secured in the bottom of the runway and suitable electrical connections for said electrodes, the liquid under treatment being a part of the electrical circuit; and it consists further in the parts and combination of parts as will be hereafter pointed out.

In the drawing.

Figure 1:
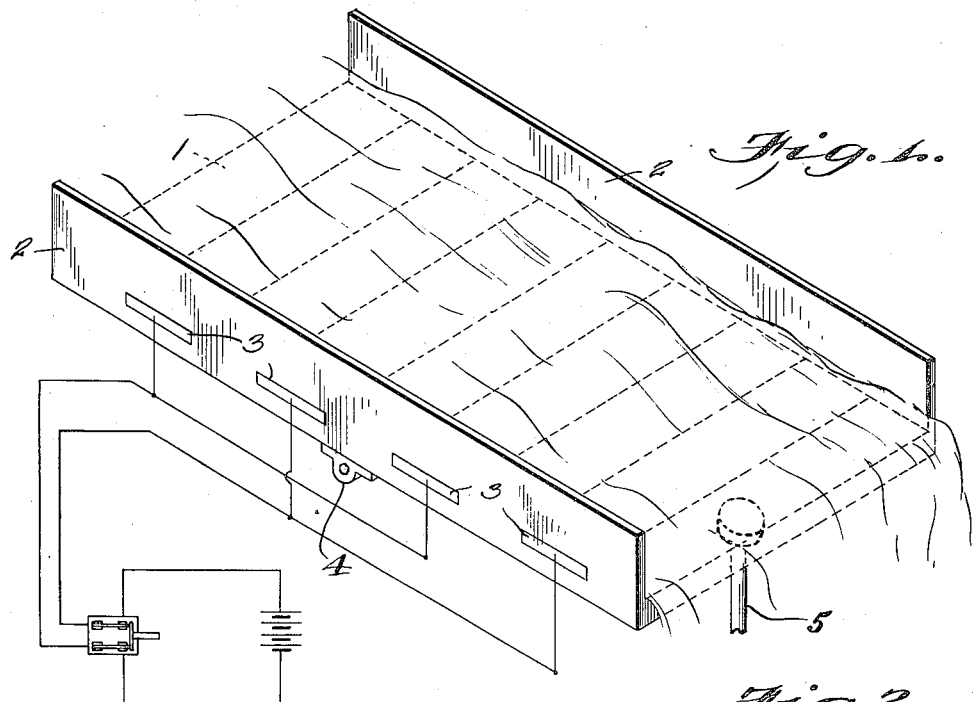
Figure 1 is a perspective view of an apparatus illustrative of my invention.
Figure 2:
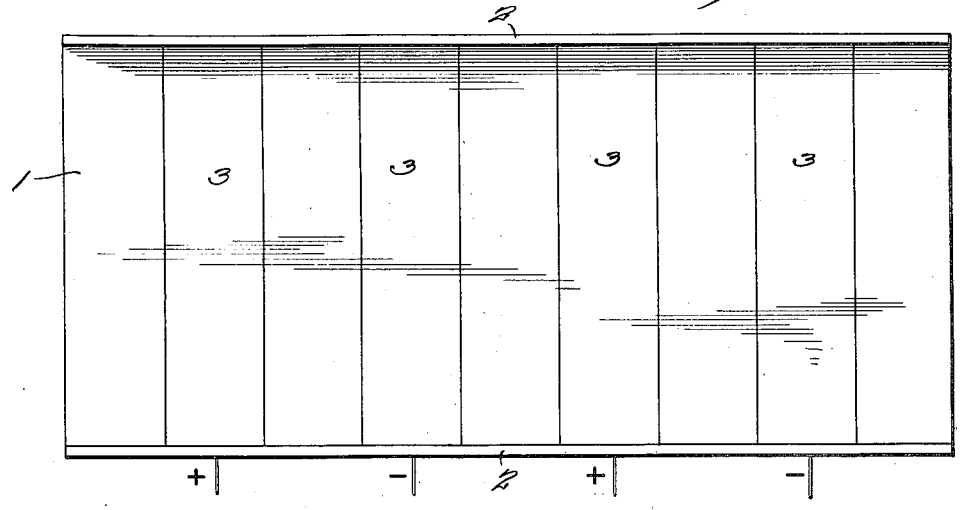
Figure 2 is a top plan view of the same.
Figure 3:
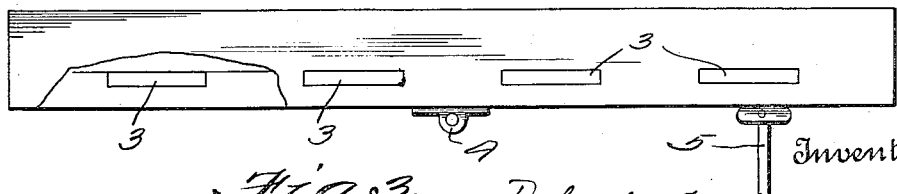
Figure 3 is a side elevation.

The reference numeral 1 designates a slab of non-conducting material along both sides of which are suitably secured side boards 2 to confine the liquid on the slab and direct the flow of the liquid lengthwise of the slab.

The slab is preferably provided with a series of transversely extending grooves in which the electrodes 3 are secured preferably flush with the top surface of the slab, but of course if desired the electrodes may project above the top surface of the slab.

The runway is suitably connected in series, as shown with any suitable source of electricity.

The apparatus, if preferred, may be pivotally mounted as at 4 and may be provided with a heat responsive or other device 5, such for example as a thermostat for tilting, and changing the angularity of the slab to make liquid flow in a stream of the desired depth found most suitable.

As the stream of liquid flows on the slab at the top and spreads over the entire face of the slab the electric current is first closed between the first and second electrodes from the top, the liquid being a part of the electrical circuit, whereby the liquid is subjected to the electrolytic action, due to the passage of the electrical current therethrough. As the liquid passes down the slab and covers the remaining electrodes the same action is set up, the stream of liquid being a part of the electrical circuit throughout the length of the board. The electrical current will of course be made strong enough to bridge the stream of liquid between the electrodes. In this way the liquid as it flows over the slab and electrodes is subjected successively to the action of the electricity and the treatment of the liquid is thorough and perfect.

The electrodes are to be made of any suitable material which will not be affected by the acid in the milk and which will not impart to the milk any objectionable odors or taste.

It will be understood that the apparatus shown is merely illustrative of my invention and that changes may be made therein within the scope of the claims.

What I claim is:

1. Apparatus for purifying, sterilizing, or aging liquids, comprising a substantially flat runway on which the liquid may flow in a continuous stream, a series of electrodes flush with the surface of said runway and operative electrical connections for said electrodes.

2. Apparatus for purifying, sterilizing, or aging liquids, comprising a runway over which the liquid may run in a continuous stream, means to automatically adjust the angularity of the runway according to the temperature of the milk, means subdividing said runway electrically whereby the stream of liquid will be subdivided electrically, the stream of liquid being a part of the electrical circuit, and operative electrical connections.

3. An apparatus for treating milk including a continuous runway free from obstruction from end to end and electrodes in said runway positioned to be engaged by the milk in its passage through the runway but not interrupting its passage through the runway.

4. The process of electrically treating liquid, consisting in introducing the liquid to be treated into a receptacle and causing it to pass in a thin sheet or film between electrodes while being subjected to currents of electricity.

In testimony whereof I affix my signature.

ROBERT C. TURNER.